United States Patent [19]

Marutake et al.

[11] 4,354,061

[45] Oct. 12, 1982

[54] SENSING COIL IN HEARING AID

[75] Inventors: Yozo Marutake, Hino; Takayuki Kurita, Tachikawa; Tatsuro Fukutome, Inagi, all of Japan

[73] Assignee: Rion Kabushiki Kaisha, Japan

[21] Appl. No.: 211,958

[22] Filed: Dec. 1, 1980

[30] Foreign Application Priority Data

Dec. 11, 1979 [JP] Japan .......................... 54-171346[U]

[51] Int. Cl.[3] ........................ H04B 5/00; H04R 25/00

[52] U.S. Cl. .................................... 179/82; 179/1 C; 179/107 FD

[58] Field of Search ............. 179/82, 1 C, 2 C, 107 R, 179/107 E, 107 FD, 182 R; 246/8; 336/58, 94; 343/100 R, 718

[56] References Cited

U.S. PATENT DOCUMENTS

| | | | |
|---|---|---|---|
| 1,601,063 | 9/1926 | Frederick | 179/107 E |
| 3,770,911 | 11/1973 | Knowles et al. | 179/107 FD |
| 3,819,860 | 6/1974 | Miller | 179/182 R |
| 3,898,565 | 8/1975 | Takeuchi et al. | 179/82 |

*Primary Examiner*—Benjamin R. Fuller
*Attorney, Agent, or Firm*—Beveridge, De Grandi & Kline

[57] ABSTRACT

A sensing coil unit for a hearing aid is made up of a sensing coil which is in the form of a cylinder one end of which is heavier than the other end and is floated in the liquid in a sealed container, so that the sensing coil is vertical at all times irrespective of the positions of the hearing aid thereby to maintain constant its magnetic coupling condition with the inductance coil which is laid to transmit voice signals to the sensing coil.

5 Claims, 1 Drawing Figure

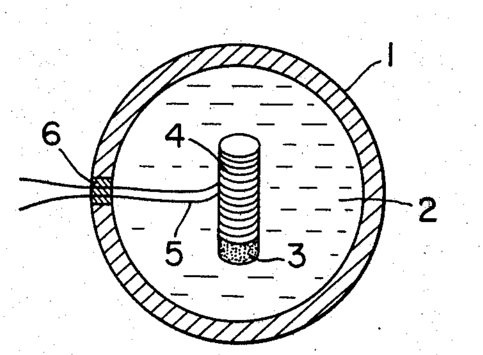
1
6
4
2
5
3

SENSING COIL IN HEARING AID

BACKGROUND OF THE INVENTION

This invention relates to an improvement of the sensing coil in a hard-of-hearing aid (hereinafter referred to as "a hearing aid", when applicable).

The sensing coils in individual hearing aids worn on persons who have difficulty in hearing (hereinafter referred to as "hard-of-hearing persons", when applicable) are magnetically coupled to a signal current corresponding to voice which flows in an induction coil which is suitably laid in a room, to allow a number of hard-of-hearing person to hear the voice. A variety of induction coils and sensing coils for this purpose have been proposed in the art.

A method of hearing voices by utilizing the magnetic coupling is superior to a method of hearing voices directly through microphones in that effects of the distances between talkers and listeners and of environmental noises can be limited, the S/N ratio can be improved, and especially the former method is useful in teaching hard-of-hearing children.

However, the conventional sensing coil employed in the former method still has problems to be solved as follows: The conventional sensing coil is fixedly mounted in a predetermined positional relation to its hearing aid body, while the strength of the voice magnetic field is directional in distribution at a hearing position. Accordingly, whenever a person wearing the conventional hearing aid turns, the direction of the sensing coil is also turned, and therefore the output acoustic pressure of the hearing aid is greatly changed. This is a great obstruction in training or teaching the hard-of-hearing children, especially in the lesson of music or in the physical training which is achieved by moving their bodies.

In order to eliminate this difficulty, a variety of sensing coils have been proposed in the art; however; they are still unsatisfactory because they have dead angles.

SUMMARY OF THE INVENTION

Accordingly, an object of this invention is to eliminate the above-described difficulty accompanying a conventional sensing coil.

More specifically, an object of this invention is to provide a sensing coil unit for a hearing aid, which is simple in construction and its sensing coil is uniformly magnetically coupled to the induction coil at all times no matter what position the hearing aid takes.

Another object of the invention is to provide a sensing coil unit for a hearing aid, which is more useful in teaching or training hard-of-hearing children.

The foregoing objects and other objects of the invention have been achieved by the provision of a sensing coil unit for a hearing aid, which, according to the invention, comprises: a sealed container made of non-magnetic material, which is filled with a liquid such as silicon oil; and a sensing coil in the form of a cylinder one end of which is heavier than the other end, the sensing coil being floated in the liquid in the sealed container.

The nature, principle and utility of the invention will become more apparent from the following detailed description and the appended claims when read in conjunction with the accompanying drawing.

BRIEF DESCRIPTION OF THE DRAWING

In the accompanying drawing, the single FIGURE is a sectional side view of a sensing coil unit according to this invention.

DETAILED DESCRIPTION OF THE INVENTION

A sensing coil unit according to this invention, as shown in the single FIGURE, comprises: a spherical sealed container 1 made of non-magnetic material such as synthetic resin or aluminum and having 10 to 12 mm in diameter, the sealed container 1 being filled with a suitable liquid 2 such as silicon oil; and a sensing coil 4 incorporated, in floating state, in the liquid 2 in the container 1. The sensing coil 4 has a weight 3 at its one end.

The output lead wires 5 of the sensing coil 4 are extended through a sealing member 6 outside the container 1 and are then connected to the electronic circuit of the hearing aid.

The sensing coil 4 has a weight 3 at its one end, as described above; however, the weight 3 may be omitted by forming the sensing coil 4 so that its one end is heavier than the other. In addition, it is obvious that it is not always necessary that the sealed container 1 is spherical.

In the hearing aid with the sensing coil unit as described above, the axis of the sensing coil 4 is always perpendicular to the ground because the sensing coil 4 floating in the liquid has the weight 3 at its one end, irrespective of the positions of the hearing aid, or no matter what position the hearing aid takes. Accordingly, even when the person wearing the hearing aid moves or turns, the output acoustic pressure of the hearing aid is maintained unchanged.

Thus, the sensing coil unit according to the invention is simple in construction and yet can uniformly magnetically coupled to the magnetic field of the induction coil at all times.

What is claimed is:

1. A sensing coil unit in a hearing aid, which comprises:

- a sealed container made of non-magnetic material, which is filled with a liquid; and
- a sensing coil in the form of a cylinder one end of which is heavier than the other end, said sensing coil being floated in said liquid in said sealed container.

2. A sensing coil unit as claimed in claim 1, in which said sensing coil has a weight at one end.

3. A sensing coil unit as claimed in claim 1, in which said sealed container is spherical.

4. A sensing coil unit as claimed in claim 1, in which said liquid filled in said sealed container is silicon oil.

5. A sensing coil unit as claimed in claim 1, in which said sensing coil has output lead wires which are extended outside said sealed container.

* * * * *